Jan. 31, 1950     R. R. PERKINS     2,495,865
POPCORN MACHINE

Filed Oct. 30, 1947     8 Sheets-Sheet 1

INVENTOR.
RONALD PERKINS
BY
Kimmel & Crowell
ATTYS.

Jan. 31, 1950
R. R. PERKINS
2,495,865
POPCORN MACHINE
Filed Oct. 30, 1947
8 Sheets-Sheet 2
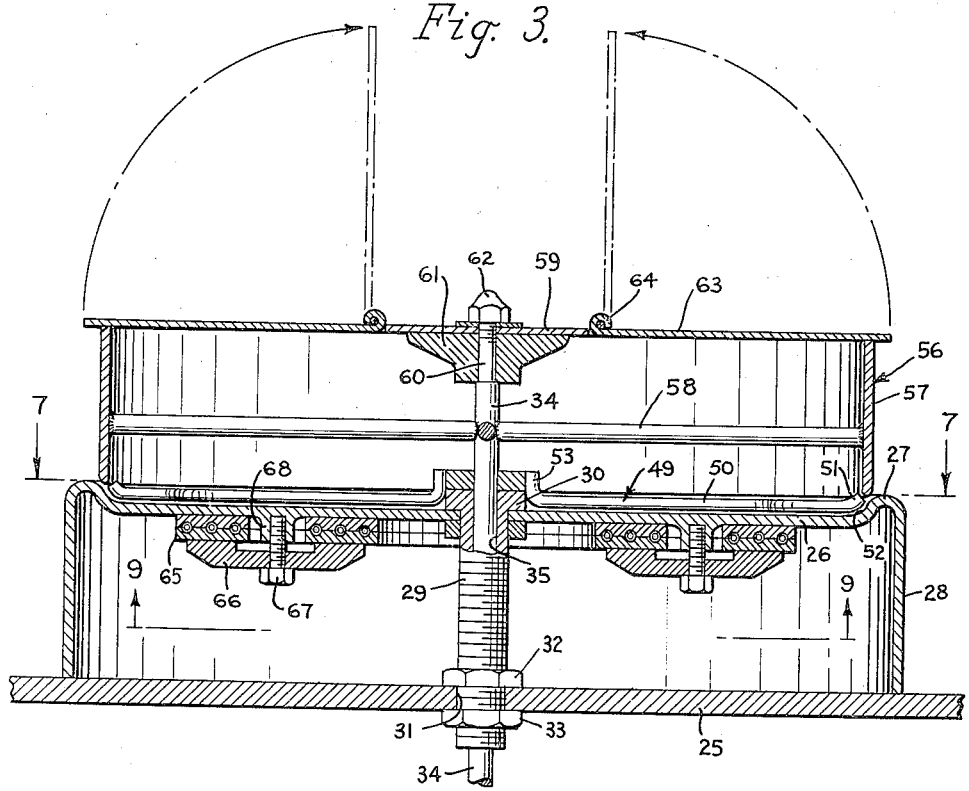
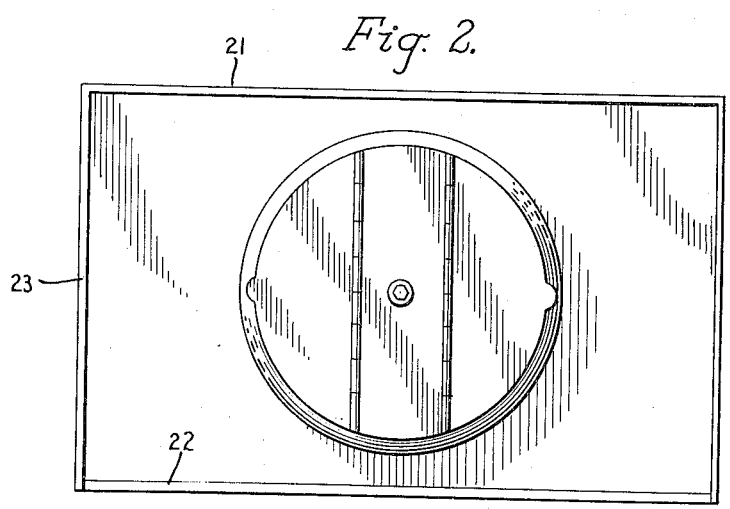
INVENTOR.
RONALD PERKINS
BY
Kimmel & Crowell
ATTYS.

Jan. 31, 1950 R. R. PERKINS 2,495,865
POPCORN MACHINE
Filed Oct. 30, 1947 8 Sheets-Sheet 3

INVENTOR.
RONALD PERKINS
BY
Kimmel & Crowell
ATTYS.

Jan. 31, 1950  R. R. PERKINS  2,495,865
POPCORN MACHINE
Filed Oct. 30, 1947  8 Sheets-Sheet 4

INVENTOR.
RONALD PERKINS
BY
Kimmel + Crowell
ATTYS.

Jan. 31, 1950  R. R. PERKINS  2,495,865
POPCORN MACHINE

Filed Oct. 30, 1947  8 Sheets-Sheet 5

INVENTOR.
RONALD PERKINS
BY
Kimmel + Crowell
ATTYS.

INVENTOR.
RONALD PERKINS
BY
Kimmel & Crowell
ATTYS.

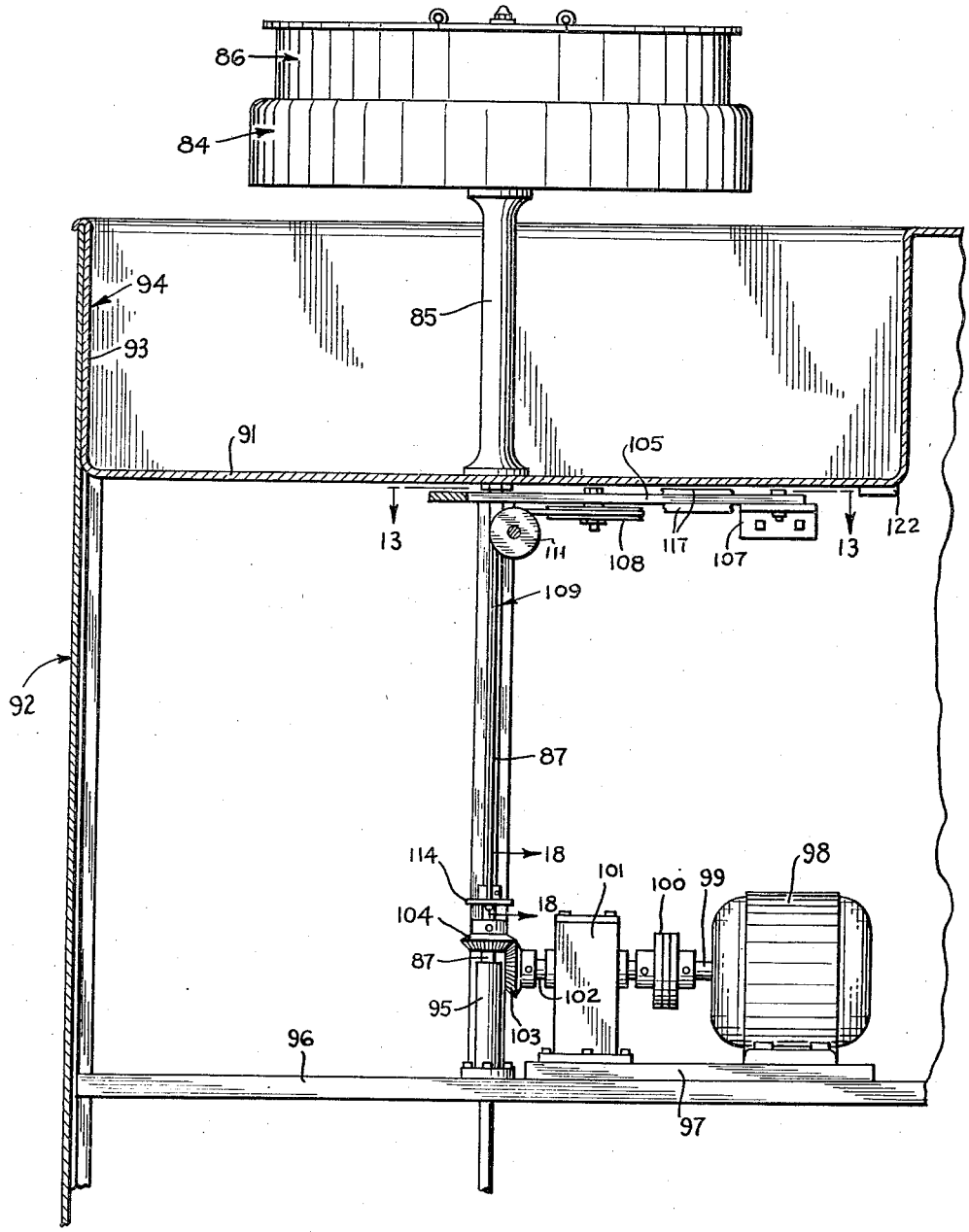

Jan. 31, 1950

R. R. PERKINS

POPCORN MACHINE

Filed Oct. 30, 1947

INVENTOR.
RONALD PERKINS
BY
Kimmel & Crowell
ATTYS.

Patented Jan. 31, 1950

2,495,865

UNITED STATES PATENT OFFICE 2,495,865

POPCORN MACHINE

Ronald R. Perkins, Dallas, Tex.

Application October 30, 1947, Serial No. 783,205

6 Claims. (Cl. 99—238.5)

This invention relates to popcorn machines.

An object of this invention is to provide a machine which is particularly designed for popping popcorn and which includes a stationary heating means, a rotary agitator, and a vertically shiftable cover.

Another object of this invention is to provide a machine of this kind which can be used for making popcorn, or for cooking meats or other food products.

A further object of this invention is to provide a machine of this kind which will pop large or small quantities of corn with equal efficiency, the popped corn being visible through a transparent kettle or cover which is disposed in inverted position over the hot plate, and the kettle or cover being vertically shiftable from an operative position overlying the hot plate to an inoperative position spaced above the hot plate. The kettle or cover is connected to an elevator which is manually controlled and when in lowered operative position is coupled to power member for rotation of the kettle or cover and an agitating means fixed relative to and rotatable with the kettle or cover.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings,

Figure 2 is a plan view of the device shown in Figure 1.

Figure 3 is a fragmentary vertical section of the upper portion of the device.

Figure 10 is a fragmentary vertical section, partly in elevation, of a modified form of this invention.

Figure 1:
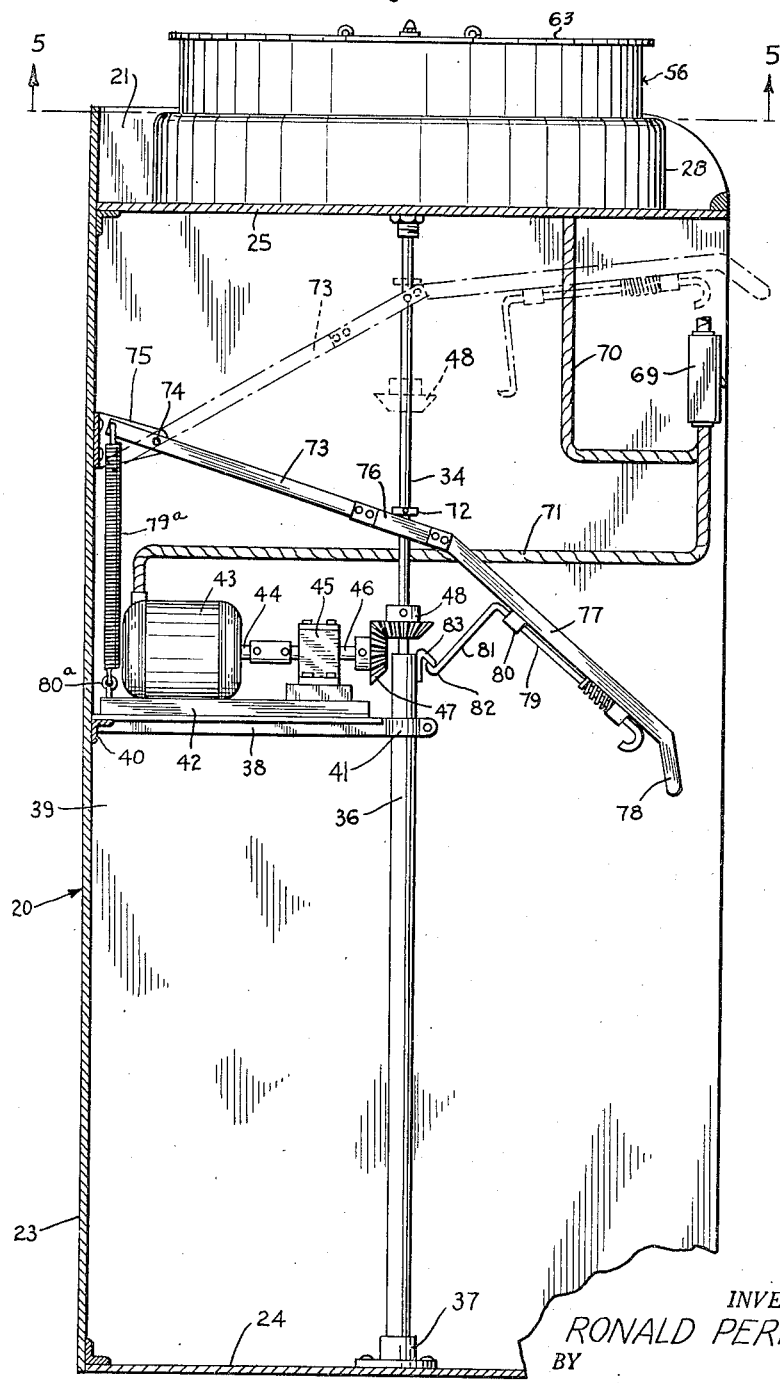
Figure 1 is a vertical section, partly broken away and in detail, of a popcorn machine constructed according to an embodiment of this invention.
Figure 4:
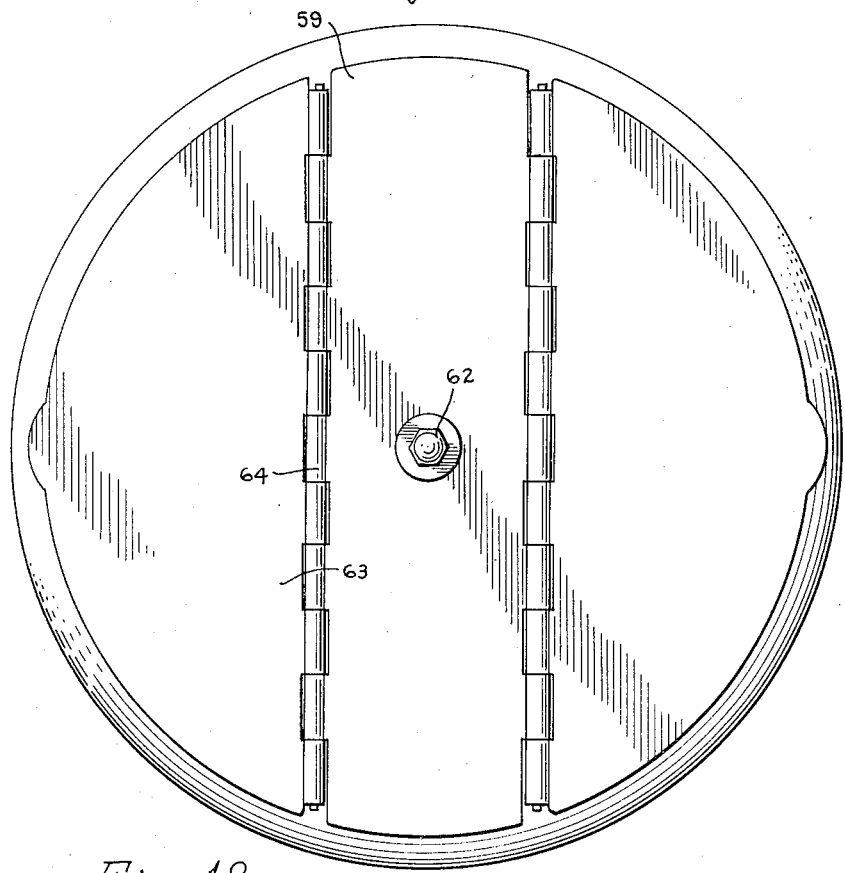
Figure 4 is a plan view of the cover and lower pan.

Referring to the drawings and first to Figures 1 to 6, inclusive, the numeral 20 designates generally an upright housing which as shown in Figure 2 is substantially rectangular in plan being formed with opposite side walls 21 and 22, a rear wall 23 and a bottom wall 24. An upper horizontal wall 25 is fixed between the opposite side and end walls being disposed as shown in Figure 1 at a point spaced downwardly from the upper edges of the side and end walls.

The front of the housing is preferably open. A tray 26 is disposed above the wall 25 and is formed at its outer margin with an upwardly offset annular rib 27. A vertical cylindrical skirt 28 extends downwardly from the rib or bead 27 and is adapted to engage on the upper side of the horizontal wall 25. The tray which includes the central plate 26, the bead 27 and the cylindrical skirt 28 is fixedly secured to the upper wall 25 by means of a hollow bolt 29 which is formed at its upper end with an annular rib 30 engaging on the upper side of the tray 26. The bolt 29 extends through a central opening 31 formed in the wall 25 and upper and lower lock nuts 32 and 33, respectively, secure the bolt 29 to the wall 25.

A vertically disposed agitator shaft 34 rotatably engages through the bore 35 of the bolt 29, extending below the wall 25 and rotatably mounted in an upright bearing post 36 which is fixed at its lower end as at 37 to the bottom wall 24. A motor supporting bracket 38 is disposed in the lower portion or lower compartment 39 of the housing 20 and the bracket 38 at its outer end is secured to an angle member 40 which is fixed to the inner side of the rear wall 23. The bracket 38 is formed at its inner end with a clamp 41 which engages about the bearing post or standard 36.

A motor platform 42 is secured to the bracket or support 38 and a motor 43 is mounted on the platform 42. The motor 43 has a shaft 44 which is connected with a speed reducing means 45 of conventional construction and a driven shaft 46 extends from the speed reducing means 45 and has a bevelled gear 47 on its inner end which meshes with a bevelled gear 48 fixed to the agitator shaft 34. The shaft 34 has fixed thereto an agitating means generally designated as 49 which engages on the upper side of the tray. The agitating means 49 includes a plurality of radially extending rods 50 which are formed at their outer ends with upturned outer portions 51 engaging closely about the concave surface 52 which is formed between the margin of the tray member 26 and the annular bead 27.

Each rod 50 is also formed at its inner end with an upturned member 53 which is adapted to be welded or otherwise fixedly secured to a collar 54 which is fixed by means of a set screw 55 to the shaft 34 for rotation and vertical movement with the shaft. A cover generally designated as 56 is mounted on the upper side of the tray and includes a cylindrical body 57 which is fixed relative to the shaft 34 by means of a plurality of radially disposed rods 58 which are welded or otherwise secured at their inner ends to the shaft 34 and are welded or otherwise secured at their outer ends to the cylindrical body 57.

A top plate 59 is mounted on the upper end of the shaft 34, the latter being reduced in diameter as indicated at 60 and having a plate 61 of substantial thickness disposed about the reduced portion 60. The top plate 59 bears against the plate 61 and is fixedly secured relative thereto by means of a nut 62. A pair of closure plates 63 are hingedly secured as at 64 to the plate 59 and are adapted when in open position to be raised to a substantially vertical position as shown in dot and dash lines in Figure 3.

The tray 26 is adapted to be heated from below by means of an electrical heating unit 65 which is of annular configuration and is secured to the lower side of the tray or plate 26 by means of clamping bars 66 through which bolts 67 engage. The bolts 67 are threaded into depending bosses 68 which are formed on the lower side of the tray or plate 26. The heating unit 65 is adapted to be connected to a switch 69 by means of a conductor 70 and a conductor 71 also connects the motor 43 with the switch 69.

In order to provide for raising and lowering of the cover 56, the shaft 34 has secured thereto below the wall 26 a collar 72. A cover operating lever 73 is rockably mounted as at 74 on a bracket 75 which is fixed to the rear wall 23 and the lever 73 is adapted to straddle the shaft 34 having secured thereto a short length of bar 76 which is formed with an offset intermediate portion, thereby providing a space through which the shaft 34 may loosely engage. The lever 73 is formed with an obtusely disposed and downwardly extending outer portion 77 terminating in an obtusely inclined handle 78. A spring 79a is secured to the inner end of the lever 73 at a point rearwardly from the pivot 74 and the spring 79a is secured at its lower end to an eye bolt 80a which is fixed relative to the platform 42.

The cover 56 is adapted to move downwardly by gravity and is held in its uppermost inoperative position by the spring 79a resiliently holding the lever 73 in the dot and dash position shown in Figure 1. The lever 73 is held against upward swinging under the action of the spring 79a by means of a spring-pressed bolt 79 which is slidable in guides 80 carried by the outer lever portion 77. The bolt 79 includes a right-angular inner portion 81 terminating in a hook 82 which is adapted to engage a keeper 83 fixed on the upper end of the bearing post 36.

Referring now to Figures 10 to 18, inclusive, there is disclosed a modified form of this invention. A heating means 84 including a tray and electrical heater similar to that disclosed in Figures 1 to 9 is mounted on a centrally disposed hollow post 85. The combined tray and heater 84 has a cover 86 mounted on the upper side thereof which is identical with the cover 56 and is secured to a shaft 87 extending downwardly through a threaded bolt 88 which extends centrally through the post 85. The post 85 is formed with an opening 89 through which the electric cables 90 to the heater are adapted to be extended. The supporting post 85 is mounted on the upper side of a receiver bottom wall 91 which is disposed within a housing 92. Bottom wall 91 has extending upwardly therefrom a cylindrical side wall 93 and the side wall 93 is substantially greater in diameter than the diameter of the tray and heater member 84 so that the popped corn may overrun the tray and drop into the receiver, generally designated as 94 and comprising the bottom wall 91 and the side wall 93. The shaft 87 is journalled at its lower end in an upstanding bearing 95 which is secured to a supporting bar or plate 96 fixed in the lower portion of the housing 92. A motor platform 97 is secured to the upper side of the supporting bar or plate 96 and a motor 98 is mounted on the platform 97.

The motor 98 has a shaft 99 which is connected through a coupling 100 to a speed reducing member 101 of conventional construction. The speed reducing member 101 has a driven shaft 102 extending therefrom on which a bevelled gear 103 is secured and the gear 103 meshes with a gear 104 which is fixed on the vertical shaft 87.

Figure 18:
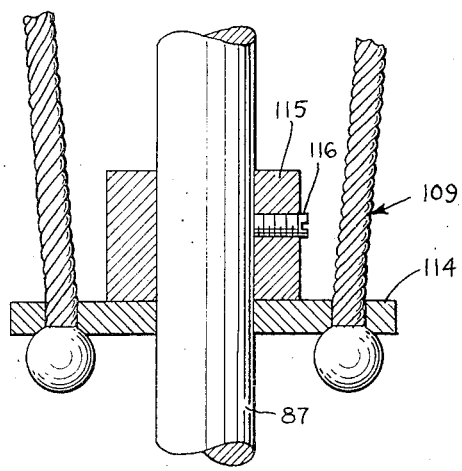
Figure 18 is a fragmentary sectional view taken on the line 18—18 of Figure 10.
Figure 5:
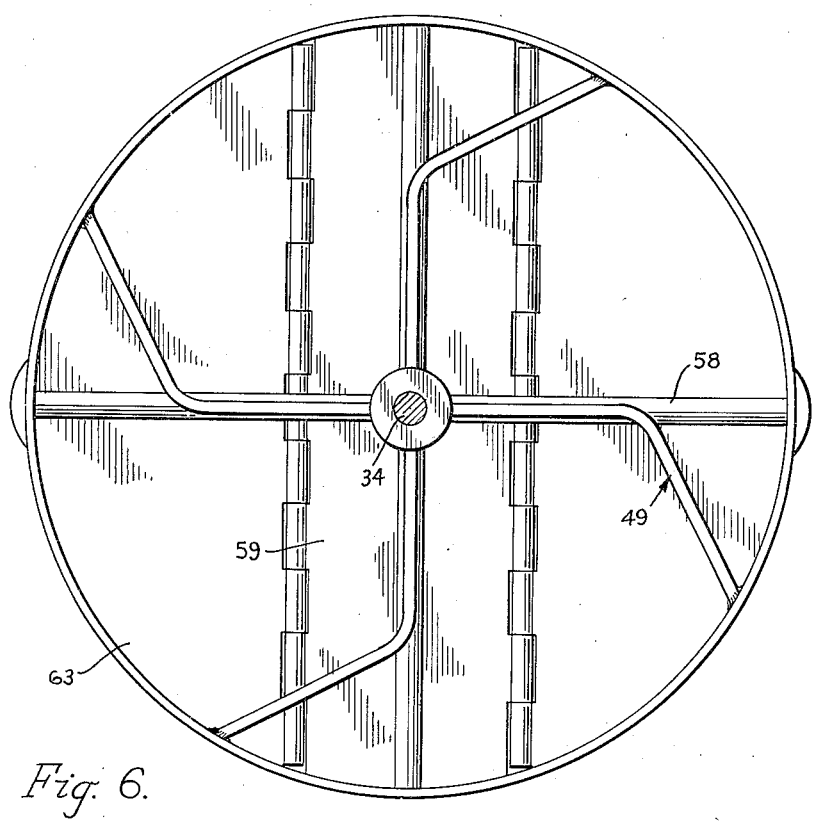
Figure 5 is a sectional view taken on the line 5—5 of Figure 1.
Figure 6:
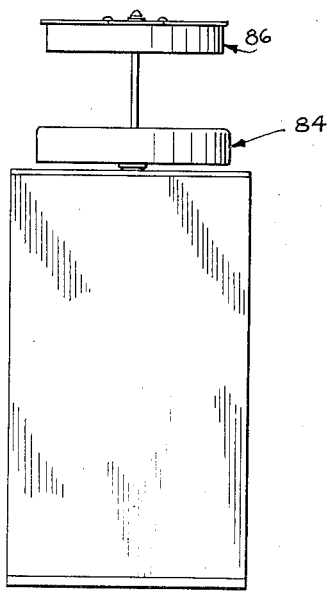
Figure 6 is a detailed rear elevation of the device showing the cover in elevated position.
Figure 7:
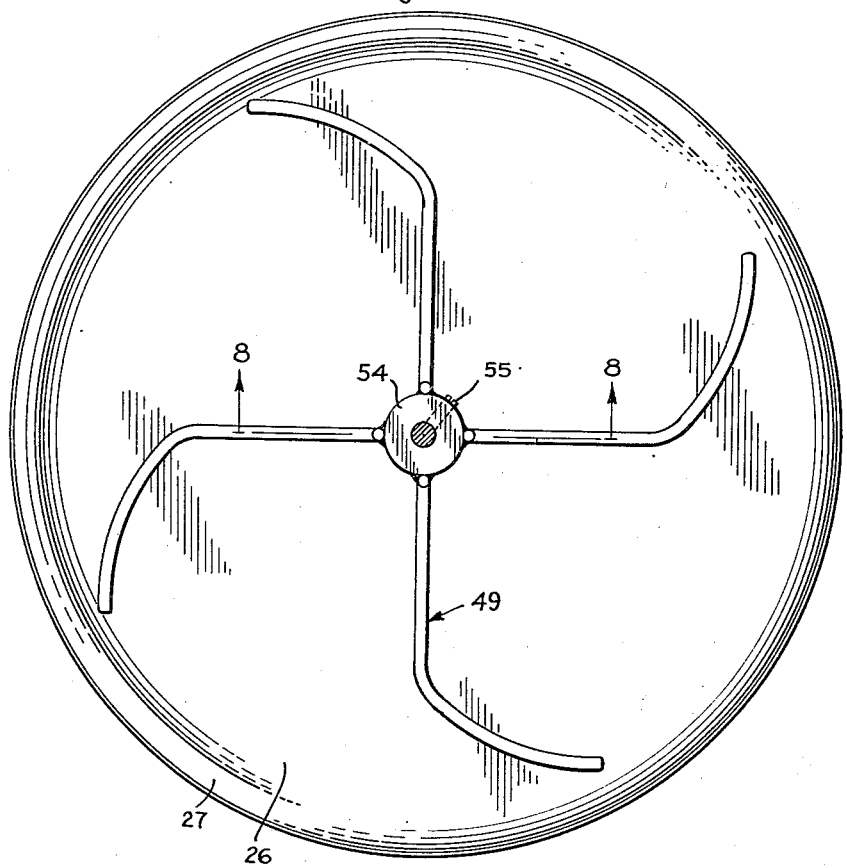
Figure 7 is a sectional view taken on the line 7—7 of Figure 3.
Figure 8:
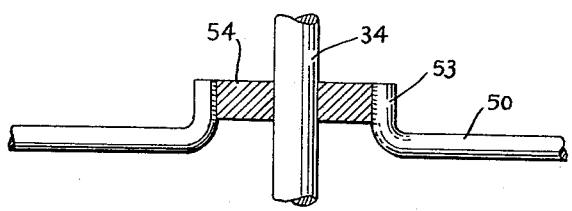
Figure 8 is a fragmentary sectional view taken on the line 8—8 of Figure 7.
Figure 11:
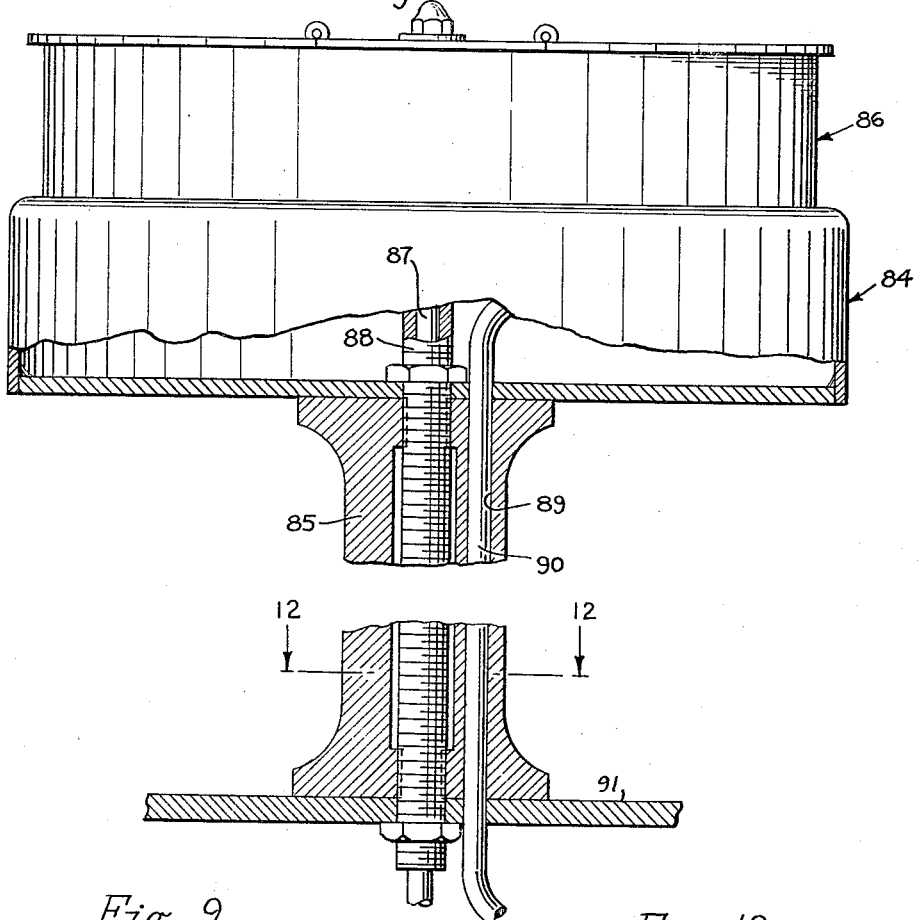
Figure 11 is a fragmentary side elevation, partly in vertical section, on an enlarged scale of the upper portion of the modification shown in Figure 10.
Figure 9:
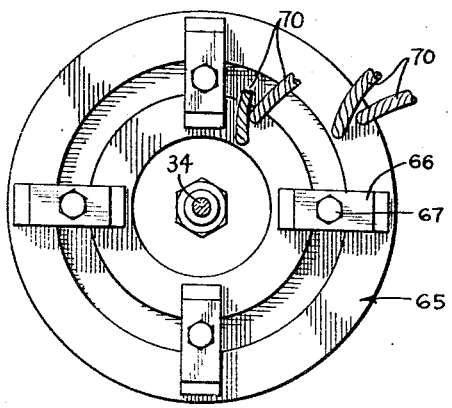
Figure 9 is a sectional view taken on the line 9—9 of Figure 3.
Figure 12:
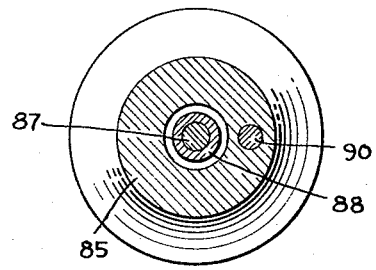
Figure 12 is a sectional view taken on the line 12—12 of Figure 11.
Figure 13:
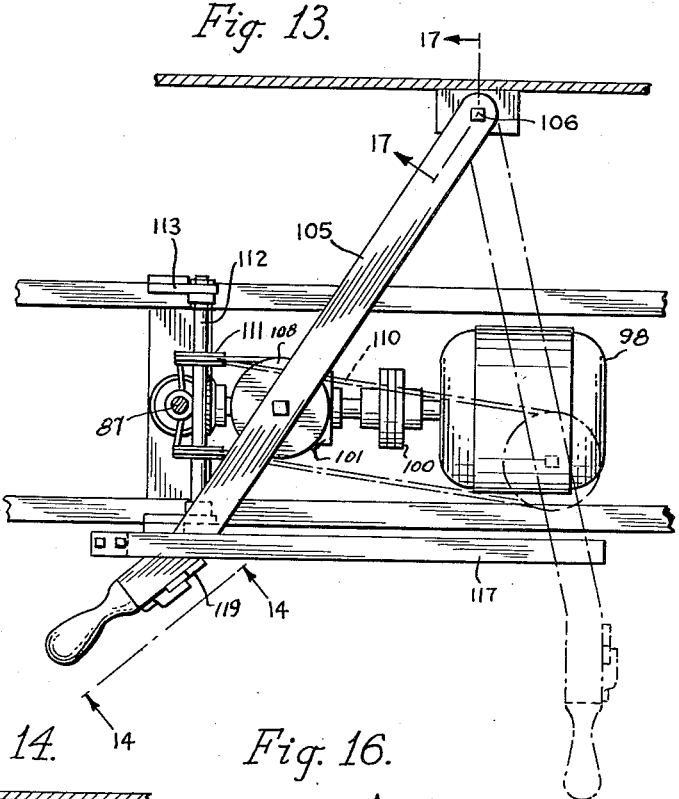
Figure 13 is a fragmentary sectional view taken on the line 13—13 of Figure 10.

In order to provide for raising the cover 86, I have provided a cover elevating lever 105 which is disposed horizontally below the bottom wall 91 and is pivotally mounted as at 106 on a bracket 107. The lever 105 has rotatably mounted thereon a pulley 108 which is secured to the lever 105 between the ends of the lever and a cable 109 is trained about the pulley 108. The cable 109 extends from diametric sides of the pulley 108 in a pair of runs 110 as shown in Figure 13 and these two runs 13 are then trained over a pair of pulleys 111 which are rotatably carried by a horizontal shaft 112 which is fixed on the upper ends of a pair of upright supporting bars 113. The two runs of the cable 109 are then extended downwardly on opposite sides of the shaft 87 and are secured in a washer 114 which loosely engages about the shaft 87 and bears at its upper side, as shown in Figure 18, against a collar 115 which is fixed by means of a set screw 116 to the shaft 87.

Figure 14:
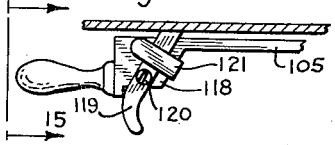
Figure 14 is a fragmentary sectional view taken on the line 14—14 of Figure 13.
Figure 15:
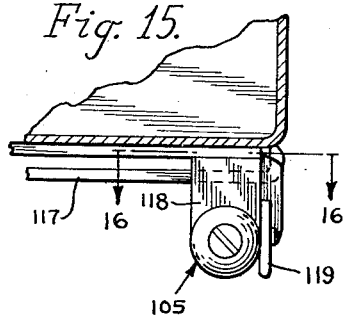
Figure 15 is a fragmentary sectional view taken on the line 15—15 of Figure 14.
Figure 16:
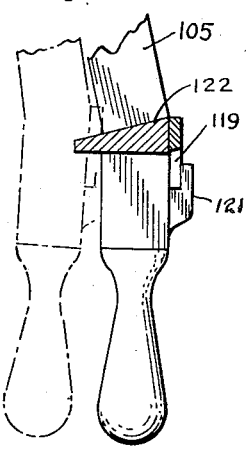
Figure 16 is a fragmentary sectional view taken on the line 16—16 of Figure 15.
Figure 17:
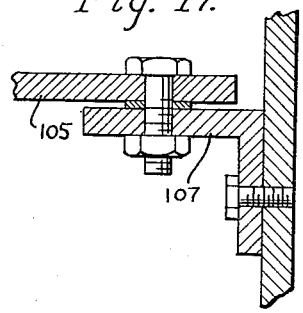
Figure 17 is a fragmentary sectional view taken on the line 17—17 of Figure 13.

The lever 105 on its lower side slidably engages a guide bar 117 which is fixed to the lower side of the receiver bottom wall 91. The lever 105 at its outer end portion is formed with a downwardly offset extension 118 on which a latching bolt 119 is pivotally mounted as indicated at 120. A looped guide 121 is fixed relative to the extension 118 as shown in Figure 14 and the bolt 119 loosely engages through the guide 121. The bolt 119 is adapted to engage a keeper member 122 which is fixed to the forward portion of the bottom wall 91 as shown in Figure 10 so that when the lever 105 is swung forwardly to the dotted line position shown in Figures 13 and 16, the bolt 119 will ride over the tapered or inclined keeper 122 and will gravitatingly engage behind this keeper as shown in Figure 16 so as to thereby lock the lever 105 in its elevating position.

In the use and operation of this invention and referring first to Figures 1 to 9, inclusive, the popcorn is placed in the tray 26, the closures 63 of the cover being elevated or raised as shown in Figure 3, to permit discharge of the popcorn inside the cover 56 and onto the tray 26. The motor 43 is connected with the source of current supply through the switch 69 and closing of the switch 69 also energizes the heater unit 65. In the operating position lever 73 is latched as shown in full lines in Figure 1. The rotation of the shaft 34 by the motor 43 will cause the popcorn in the tray 26 to be agitated as it is heated and when the popcorn has been popped the cover 56 is raised by unlatching the lever 73 and raising this lever to the dot and dash position shown in Figure 1. Spring 79ª will hold lever 73 in its uppermost position. The popcorn, no longer laterally supported by the cylindrical cover wall 57, will spill out over the bead 57 on the tray 26 and will then drop into the upper portion of the housing 20 on the upper side of the wall 25. The device shown in Figures 10 to 18, inclusive, will operate similar to that for Figures 1 to 9, with the exception that the closure 86 is elevated by horizontal swinging of the lever 105.

I claim:

1. A popcorn machine comprising an upright casing, a heater housing on the upper end of said casing, said housing including a cylindrical side wall and a top wall formed with upwardly curved marginal edges, said top wall constituting a hot plate, a heating element in said housing, a vertically disposed rotary shaft extending through said housing, a cover fixed to said shaft and adapted when in lower operative position to overlie said top wall, agitating arms fixed to said shaft above said top wall, a power member in said casing, a driving connection between said power member and said shaft, and means in said casing correlated with said shaft for moving the latter endwise.

2. A popcorn machine comprising an upright casing, a heater housing on the upper end of said casing, said housing including a dished top wall and a cylindrical side wall, a cover, a shaft fixed to said cover rotatably extending downwardly through said housing and into said casing, a heater in said housing, means for rotating said shaft, an agitator fixed to said shaft and adapted when in operative position to be disposed closely adjacent the upper side of said top wall, a cover fixed to said shaft and engaging about said agitator, and means for elevating said shaft and cover, said latter means including resilient means for normally holding said shaft and cover in an upper inoperative position.

3. A popcorn machine comprising an upright casing, a heater housing on the upper end of said casing, said housing including a dished top wall and a cylindrical side wall, a cover, a shaft fixed to said cover rotatably extending downwardly through said housing and into said casing, a heater in said housing, means for rotating said shaft, an agitator fixed to said shaft and adapted when in operative position to be disposed closely adjacent the upper side of said top wall, a cover fixed to said shaft and engaging about said agitator, and means for elevating said shaft and cover, said latter named means including a rock lever carried by said casing, and a collar fixed to said shaft and engageable by said lever upon upward rocking thereof for raising said shaft to inoperative position.

4. A popcorn machine comprising an upright casing, a heater housing on the upper end of said casing, said housing including a dished top wall and a cylindrical side wall, a cover, a shaft fixed to said cover rotatably extending downwardly through said housing and into said casing, a heater in said housing, means for rotating said shaft, an agitator fixed to said shaft and adapted when in operative position to be disposed closely adjacent the upper side of said top wall, a cover fixed to said shaft and engaging about said agitator, and means for elevating said shaft and cover, said latter named means including a rock lever carried by said casing, a spring constantly urging said lever to an upper position, and a collar fixed on said shaft engageable by said lever for raising said shaft to inoperative position.

5. A popcorn machine comprising an upright casing, a heater housing on the upper end of said casing, said housing including a dished top wall and a cylindrical side wall, a cover, a shaft fixed to said cover rotatably extending downwardly through said housing and into said casing, a heater in said housing, means for rotating said shaft, an agitator fixed to said shaft and adapted when in operative position to be disposed closely adjacent the upper side of said top wall, a cover fixed to said shaft and engaging about said agitator, and means for elevating said shaft and cover, said latter means including a horizontally swingable lever carried by said casing, a flexible operative connection between said lever and said shaft, and latch means for locking said lever in a shaft elevating position.

6. A popcorn machine comprising an upright casing, a heater housing on the upper end of said casing, said housing including a dished top wall and a cylindrical side wall, a cover, a shaft fixed to said cover rotatably extending downwardly through said housing and into said casing, a heater in said housing, means for rotating said shaft, an agitator fixed to said shaft and adapted when in operative position to be disposed closely adjacent the upper side of said top wall, a cover fixed to said shaft and engaging about said agitator, and means for elevating said shaft and cover, said latter named means including a rock lever carried by said casing, a spring constantly urging said lever to an upper position, and spring-pressed latch means for latching said lever in a lower position.

RONALD R. PERKINS.

REFERENCES CITED

The following references are of record in the file of this patent:

UNITED STATES PATENTS

| Number | Name | Date |
|---|---|---|
| 2,441,941 | Shafter | May 18, 1948 |

FOREIGN PATENTS

| Number | Country | Date |
|---|---|---|
| 2,103 | Great Britain | A. D. 1895 |